US012420575B2

(12) United States Patent
Asamoto

(10) Patent No.: US 12,420,575 B2
(45) Date of Patent: Sep. 23, 2025

(54) TRANSPORT DEVICE AND RECORDING DEVICE

(71) Applicant: SEIKO EPSON CORPORATION, Tokyo (JP)

(72) Inventor: Katsuya Asamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 18/520,154

(22) Filed: Nov. 27, 2023

(65) Prior Publication Data

US 2024/0176290 A1 May 30, 2024

(30) Foreign Application Priority Data

Nov. 28, 2022 (JP) ................................. 2022-188956

(51) Int. Cl.
*B41J 29/377* (2006.01)
*B41J 11/00* (2006.01)
*B41J 15/04* (2006.01)

(52) U.S. Cl.
CPC .......... *B41J 29/377* (2013.01); *B41J 11/0015* (2013.01); *B41J 11/007* (2013.01); *B41J 15/048* (2013.01)

(58) Field of Classification Search
CPC .... B41J 29/377; B41J 11/0015; B41J 11/007; B41J 15/048
See application file for complete search history.

(56) References Cited

U.S. PATENT DOCUMENTS

2011/0199447 A1* 8/2011 Takahashi ............ B41J 11/0015
347/102

FOREIGN PATENT DOCUMENTS

EP 3842246 A 6/2021
JP 2022-007552 A 1/2022

* cited by examiner

*Primary Examiner* — Justin Seo
(74) *Attorney, Agent, or Firm* — WORKMAN NYDEGGER

(57) ABSTRACT

A transport device 21 for transporting a medium 99 to be recorded by a recording section 12 includes a transport belt 25 for transporting the medium; a pressing section 31 that is located further upstream than the recording section in a transport direction of the medium and presses the medium against the transport belt while heating the medium; a cover 32 covering the recording section and the pressing section, which has an intake port 36, and a fan 51 that draws air into the cover through the intake port and is located further upstream than the intake port in the transport direction, wherein the intake port is located between the recording section and the pressing section in the transport direction.

6 Claims, 2 Drawing Sheets

TRANSPORT DEVICE AND RECORDING DEVICE

The present application is based on, and claims priority from JP Application Serial Number 2022-188956, filed Nov. 28, 2022, the disclosure of which is hereby incorporated by reference herein in its entirety.

BACKGROUND

1. Technical Field

The present disclosure relates to a transport device and a recording device.

2. Related Art

JP-A-2022-7552 discloses a recording device including a recording section that performs recording on a medium, a transport belt that transports the medium, a pressing section that presses the medium against the transport belt, and a cover that covers the recording section and a pressing section. In this recording device, the pressing section presses the medium against the transport belt, so that the medium is attached to the transport belt.

In such a recording device, the pressing section may press the medium against the transport belt while heating the medium and then attach the medium to the transport belt. However, when the pressing section heats the medium, the heat may be conducted downstream in the transport direction. For example, if heat is conducted to the recording section, the recording quality may be impaired.

SUMMARY

A transport device that solves the above problem is a transport device that transports a medium to be recorded by a recording section, includes a transport belt for transporting the medium; a pressing section that is located further upstream in a transport direction of the medium than is the recording section and that presses the medium against the transport belt while heating the medium; a cover that covers the recording section and the pressing section and that has an intake port; and a fan that draws air into the cover through the intake port and that is located further upstream in the transport direction than is the intake port, wherein the intake port is located between the recording section and the pressing section in the transport direction.

A recording device that solves the above problem includes a recording section that records to the medium; a transport belt for transporting the medium; a pressing section that is located further upstream in a transport direction of the medium than is the recording section and that presses the medium against the transport belt while heating the medium; a cover that covers the recording section and the pressing section and that has an intake port; and a fan that draws air into the cover through the intake port and that is located further upstream in the transport direction than is the intake port, wherein the intake port is located between the recording section and the pressing section in the transport direction.

DESCRIPTION OF EMBODIMENTS

An example of a recording device equipped with a transport device will be described below with reference to figures. The recording device is, for example, an inkjet printer that records text, photographs or other images by ejecting ink, which is an example of a liquid, onto a medium such as paper or fabric.

Recording Device

Figure 1:
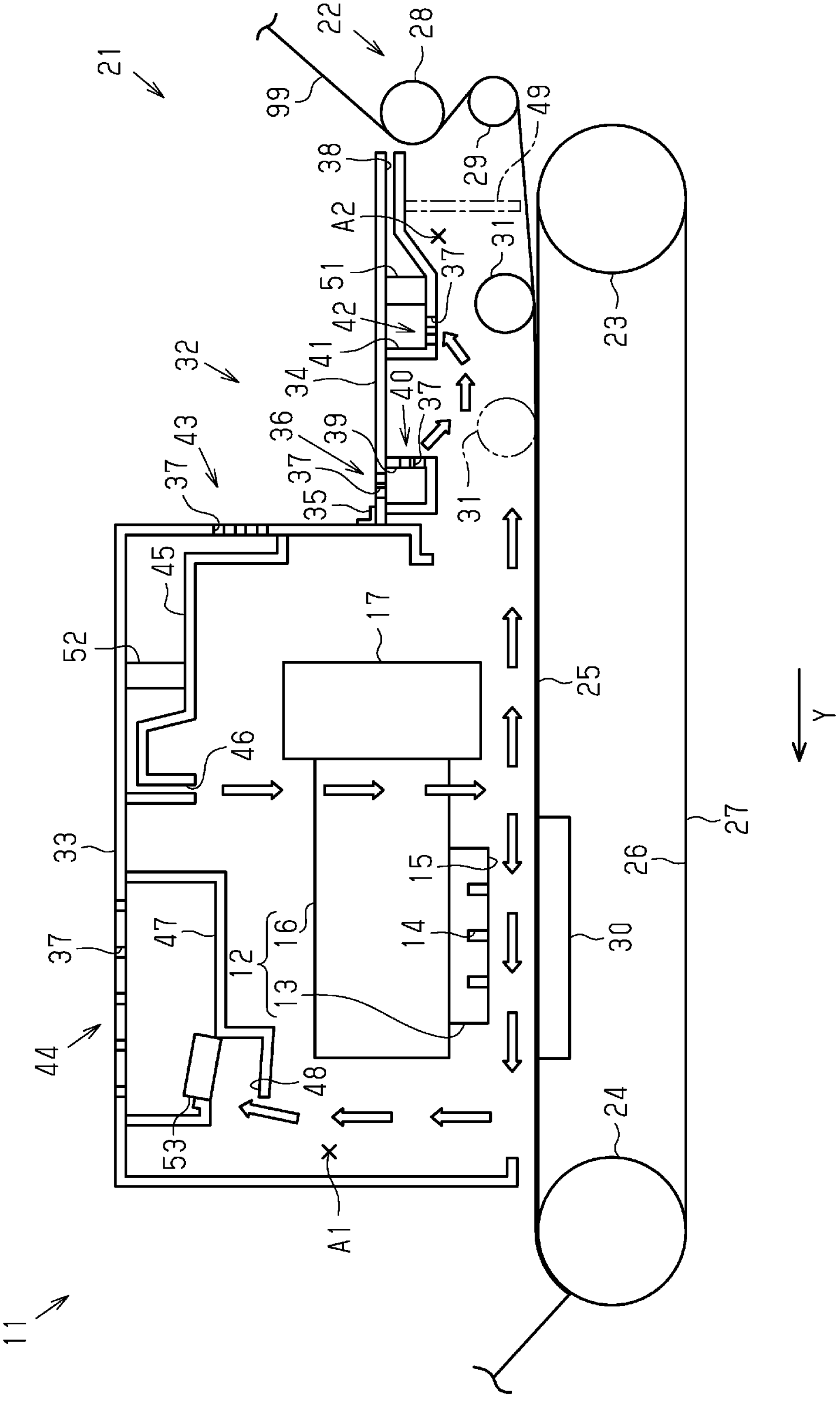
FIG. 1 is a side view showing an embodiment of a recording device including a transport device.

As shown in FIG. 1, the recording device 11 is equipped with recording section 12. The recording section 12 is configured to record to the medium 99. The recording section 12 records to the medium 99 by ejecting liquid onto the medium 99. Recording by the recording section 12 is not limited to liquid; for example, toner may be recorded on the medium 99 by spraying the toner onto the medium 99.

The recording section 12 has a head 13. The head 13 has a nozzle surface 15 in which one or more nozzles 14 are opened. The nozzle surface 15 faces the medium 99. The head 13 ejects liquid from the nozzles 14 onto the medium 99.

The recording section 12 has a carriage 16. The carriage 16 mounts the head 13. The carriage 16 scans the medium 99. The recording device 11 is a serial printer. The recording device 11 may be a line printer capable of ejecting liquid simultaneously across the width of the medium 99.

The recording device 11 is equipped with a holding section 17. The holding section 17 holds the recording section 12. The holding section 17 is connected to the carriage 16. The holding section 17 guides the movement of the carriage 16. The holding section 17 includes, for example, a guide rail.

The recording device 11 is equipped with a transport device 21. The transport device 21 transports the medium 99. Images are recorded on the medium 99 by the recording section 12 while the medium 99 is transported by the transport device 21.

Transport Device

Next, the transport device 21 will be described. The transport device 21 is equipped with a transport section 22. The transport section 22 is configured to transport the medium 99. The transport section 22 has a first roller 23, a second roller 24, and a transport belt 25. The transport belt 25 is wound around the first roller 23 and the second roller 24. The transport belt 25 rotates along the first roller 23 and the second roller 24 as the first roller 23 and the second roller 24 rotate. In FIG. 1, the transport belt 25 rotates in the counterclockwise direction. The transport belt 25 transports the medium 99 in the transport direction Y by rotating. The transport belt 25 faces the recording section 12. Thus, an image is recorded on the medium 99 by the recording section 12 on the transport belt 25.

The transport belt 25 has an inner circumferential surface 26 and an outer circumferential surface 27. The inner circumferential surface 26 is a surface that contacts the first roller 23 and the second roller 24. The outer circumferential surface 27 is a surface that contacts the medium 99. Thus, the outer circumferential surface 27 can be said to be a surface that supports the medium 99. The outer circumferential surface 27 faces the nozzle surface 15.

The transport belt 25 is an adhesive belt to which the medium 99 is attached. An adhesive is applied to the outer circumferential surface 27. Thus, the medium 99 is attached to the outer circumferential surface 27. This allows the medium 99 to be transported in a stable posture. After images are recorded by the recording section 12, the medium 99 is pulled off from the outer circumferential surface 27, for example, by being pulled by another device. The transport device 21 may have a pull-off section that pulls the medium 99 away from the outer circumferential surface 27. In this case, the pull-ff section is, for example, a roller around which the medium 99 is wound.

The transport section 22 may have one or more winding rollers. In one example, the transport section 22 has a first winding roller 28 and a second winding roller 29. The first winding roller 28 and the second winding roller 29 transport the medium 99 by rotating with the medium 99 being wound around them. The first winding roller 28 and the second winding roller 29 contact the medium 99 before the medium 99 is attached to the transport belt 25. When the medium 99 is transported by the transport section 22, the medium 99 contacts the first winding roller 28, the second winding roller 29, and the transport belt 25, in this order.

The transport device 21 may be equipped with a support section 30. The support section 30 is located in a region surrounded by the transport belt 25. The support section 30 contacts the inner circumferential surface 26. The support section 30 supports the medium 99 over the transport belt 25. The support section 30 is positioned facing the recording section 12. Thus, the region of the medium 99 that is supported by the support section 30 is recorded by the recording section 12. This stabilizes the posture of the medium 99 when the recording section 12 records to the medium 99, thereby improving recording quality.

The transport device 21 is equipped with a pressing section 31. The pressing section 31 is configured to press the medium 99 against the transport belt 25. Specifically, the pressing section 31 presses the medium 99 against the outer circumferential surface 27. The pressing section 31 attaches the medium 99 to the transport belt 25 by pressing the medium 99 onto the transport belt 25. The pressing section 31 is located further upstream than the recording section 12 in the transport direction Y. The pressing section 31 presses the medium 99 that has passed through the first winding roller 28 and the second winding roller 29 onto the transport belt 25.

The pressing section 31 presses the medium 99 onto the transport belt 25 while heating it. In one example, the pressing section 31 is a heat roller. When the pressing section 31 heats the medium 99, the medium 99 is more likely to attach to the transport belt 25.

The pressing section 31 may be configured to reciprocate in the transport direction Y. The pressing section 31, for example, reciprocates between the position shown by the solid line and the position shown by the two-dotted chain line in FIG. 1. The pressing section 31 presses the medium 99 onto the transport belt 25 while reciprocating in the transport direction Y. This makes it easier for the medium 99 to stick to the transport belt 25 compared to when the pressing section 31 presses the medium 99 onto the transport belt 25 while the pressing section 31 is stationary.

The transport device 21 is equipped with a cover 32. The cover 32 is configured to cover the recording section 12 and the pressing section 31. The cover 32 may cover other components in addition to the recording section 12 and the pressing section 31. By covering the recording section 12 and the pressing section 31 with the cover 32, the possibility of dust from the air adhering to the recording section 12 and the pressing section 31, and the possibility of users accidentally touching the recording section 12 and the pressing section 31 are reduced.

The cover 32 defines a first space A1 and a second space A2. The first space A1 and the second space A2 are spaces inside the cover 32. The first space A1 and the second space A2 are connected inside the cover 32. The first space A1 is a space where the recording section 12 is located. The second space A2 is a space where the pressing section 31 is located.

The cover 32 has a first cover member 33 and a second cover member 34. The first cover member 33 covers the recording section 12. In one example, the first cover member 33 covers the recording section 12 and the holding section 17. The first cover member 33 defines the first space A1. The second cover member 34 covers the pressing section 31. The second cover member 34 defines a second space A2.

The second cover member 34 is located further upstream than the first cover member 33 in the transport direction Y. The second cover member 34 is attached to the first cover member 33. The second cover member 34 may be configured to open and close, i.e., displace, with respect to the first cover member 33. In one example, the second cover member 34 is attached to the first cover member 33 using a hinge 35. When the second cover member 34 opens, the user can access the pressing section 31.

The cover 32 covers the recording section 12 and the pressing section 31 to protect the recording section 12 and the pressing section 31. On the other hand, the heat from the pressing section 31 can easily cause the inside of the cover 32 to become high temperature. If the temperature inside the cover 32 become too high, there is a possibility that the recording quality will be affected. For example, if the first space A1 becomes hot, there is a possibility that the liquid ejected by the head 13 will denature. For example, if the first space A1 and the second space A2 become hot, there is a possibility that the transport belt 25 will be deformed. For example, if the first space A1 becomes hot, there is a possibility that the support section 30 will be deformed. Therefore, it is desirable that the heat from the pressing section 31 be conducted as little as possible downstream in the transport direction Y. For example, heat from the pressing section 31 should be conducted as little as possible inside the first cover member 33.

The cover 32 has an intake port 36. The intake port 36 is an opening in the cover 32 for intake of air from outside the cover 32, i.e., outside air. Outside air is drawn into cover 32 through the intake port 36 by a fan 51 (to be described later). The intake port 36 is located between the recording section 12 and the pressing section 31 in the transport direction Y. In detail, the intake port 36 is located further downstream than the pressing section 31 when the pressing section 31 is at its most downstream position in the transport direction Y, and further upstream than the recording section 12. The intake port 36 is opened in the second cover member 34. Thus, air is supplied to the second space A2 through the intake port 36. This reduces the possibility of high temperatures inside the cover 32 due to air being drawn into the cover 32 from the intake port 36. In particular, the possibility of high temperatures in the second space A2 is reduced.

The intake port 36 opens in the top surface of the second cover member 34. In other words, the intake port 36 opens toward the vertical direction. Thus, through the intake port 36, air flows downward from outside the cover 32 to inside the cover 32. The air drawn in from the intake port 36 flows upstream in the transport direction Y by the fan 51 in the second space A2.

Figure 2:
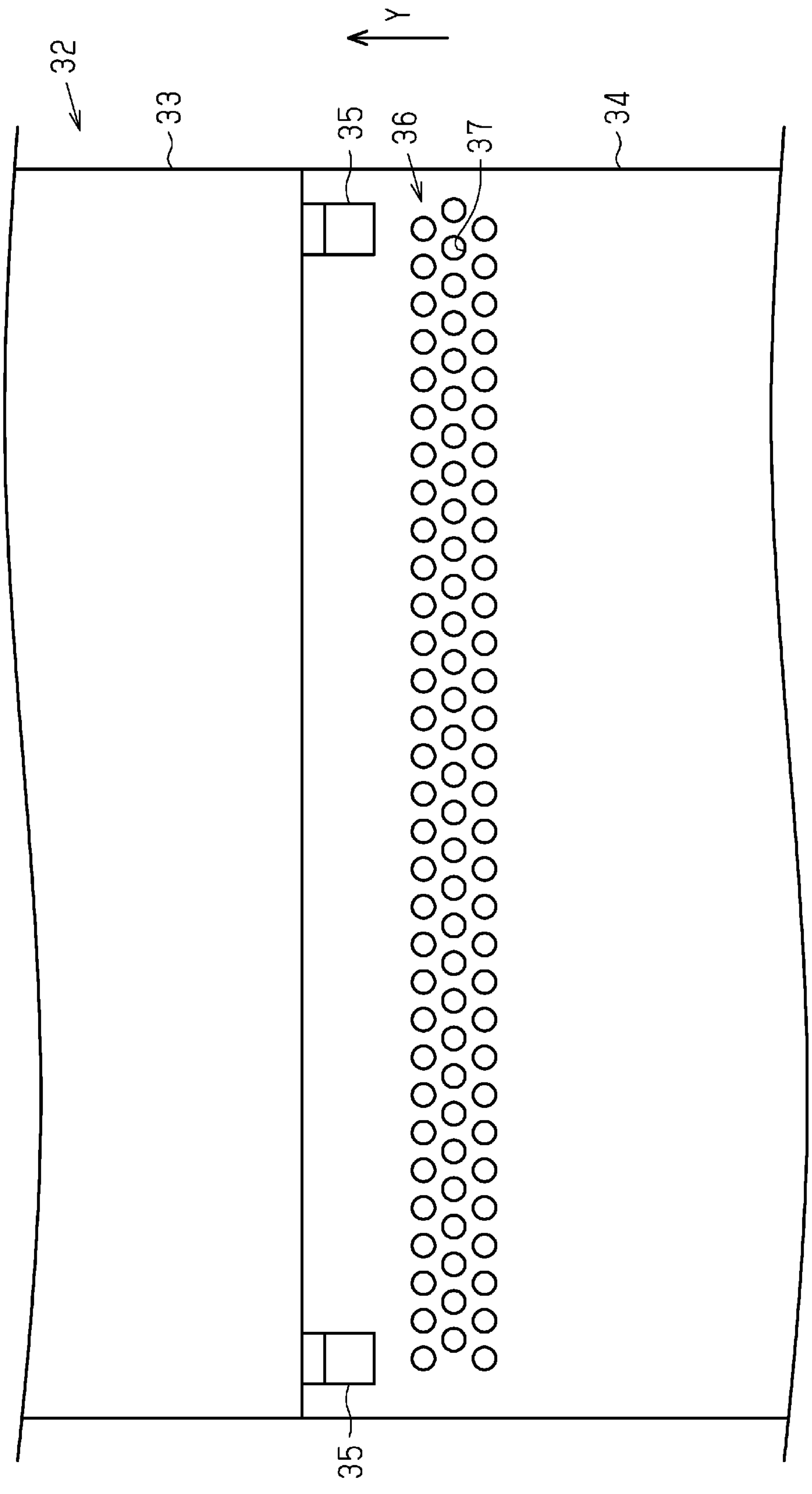
FIG. 2 is a plan view showing an intake port.

As shown in FIG. 2, the intake port 36 is composed of a plurality of through holes 37. The plurality of through holes 37 are so-called punch holes. This reduces the possibility of dust entering the cover 32 through the intake port 36. Further, the configuration of the intake port 36 with a plurality of through holes 37 can limit the amount of intake air from the intake port 36. Thus, air can easily flow from the first space A1 to the second space A2 by the fan 51 which draws air into the second space A2 from the intake port 36. This makes it difficult for heat from the pressing section 31 to be conducted.

As shown in FIG. 1, the cover 32 has an exhaust port 38. The exhaust port 38 is an opening for exhausting air from inside the cover 32. The fan 51 exhausts air out of the cover 32 through the exhaust port 38. The exhaust port 38 is located further upstream than the intake port 36 in the transport direction Y. The exhaust port 38 opens in the second cover member 34. Thus, the air is exhausted from the second space A2 through the exhaust port 38.

Air drawn in through the intake port 36 is exhausted through the exhaust port 38. The air drawn in through intake port 36 flows toward the exhaust port 38. In other word, the air drawn in through the intake port 36 flows toward the upstream in the transport direction Y in the cover 32. This makes it difficult for heat from the pressing section 31 to be conducted downstream in the transport direction Y.

The air exhausted from the exhaust port 38 is blown onto the medium 99 before the medium 99 is pressed onto the transport belt 25. Specifically, the exhaust port 38 opens toward the first winding roller 28. The air exhausted from the exhaust port 38 is blown onto a portion of the medium 99 wound around the first winding roller 28. Thus, air heated by the pressing section 31 is blown onto the medium 99, and then the medium 99 is preheated. This makes it easier for the medium 99 to stick to the transport belt 25. In addition, by blowing air heated by the pressing section 31 onto the medium 99, fluff, dust, and the other particles adhering to the medium 99 are removed. This improves recording quality.

The cover 32 may have an intake duct 39. The intake duct 39 is a duct that connects to the intake port 36. The intake duct 39 has an internal space through which air can flow. The intake duct 39 is attached to the second cover member 34. Specifically, the intake duct 39 is attached to a surface of inner wall of the second cover member 34. The inner wall of the second cover member 34 forms part of the intake duct 39. The inner wall surface of the second cover member 34 is a wall surface of the second cover member 34 facing the media 99 or outer circumferential surface 27 when the second cover member 34 is covering the pressing section 31. The inner wall of the second cover member 34 is a wall opposite to the outer wall of the second cover member 34 that is in contact with the outside air. Air drawn in through the intake port 36 flows through the intake duct 39. The air intake duct 39 is located between the recording section 12 and the pressing section 31 in the transport direction Y.

The intake duct 39 has an outflow port 40. The outflow port 40 may be composed of a plurality of through holes 37, similar to the intake port 36. Air is supplied to the second space A2 through the outflow port 40. In the intake duct 39, the outflow port 40 opens toward upstream in the transport direction Y. Thus, the intake duct 39 changes the flow of air drawn in through the intake port 36. The outflow port 40 opens toward upstream in the transport direction Y. Thus, air can easily flow from the intake port 36 toward upstream in the transport direction Y. Thus, heat from the pressing section 31 is less likely to be conducted downstream in the transport direction Y. Further, the intake duct 39 traps dust entering through the intake port 36. Therefore, the possibility of dust entering the cover 32 is reduced compared to a configuration in which dust is drawn directly into the cover 32 from the intake port 36.

The cover 32 may have an exhaust duct 41. The exhaust duct 41 is a duct that connects to the exhaust port 38. The exhaust duct 41, like the intake duct 39, has an internal space through which air can flow. The exhaust duct 41 is attached to the second cover member 34. Specifically, the exhaust duct 41 is attached to the surface of the inner wall of the second cover member 34, similar to the intake duct 39. The inner wall of the second cover member 34 forms part of the exhaust duct 41. The exhaust duct 41 is located further upstream than the intake duct 39 in the transport direction Y. The exhaust duct 41 is located above the pressing section 31. In one example, the exhaust duct 41 is located directly above the pressing section 31 when the pressing section 31 is at its most upstream position in the transport direction Y.

The exhaust duct 41 has an inflow port 42. The inflow port 42 may be composed of a plurality of through holes 37, similar to the intake port 36. Through the inflow port 42, air flows into the exhaust duct 41. Specifically, air that flows into the portion covered by the second cover member 34 through intake port 36 and outflow port 40 further flows into the exhaust duct 41 through inflow port 42. In the exhaust duct 41, the inflow port 42 opens toward the vertical direction. In other words, in the exhaust duct 41, the inflow port 42 opens toward the pressing section 31. Thus, the air in the second space A2 flows into the exhaust duct 41 through the inflow port 42 while hitting the pressing section 31. For example, as shown by white arrows in the second space A2, air flows from the outflow port 40 toward the inflow port 42.

The inflow port 42 is located above the pressing section 31. Specifically, the inflow port 42 is located above a region where the pressing section 31 moves. In one example, the inflow port 42 is located directly above the pressing section 31 when the pressing section 31 is at its most upstream position in the transport direction Y. This makes it easier for air drawn into the exhaust duct 41 through the inflow port 42 to hit the pressing section 31.

The exhaust duct 41 extends from the inflow port 42 to the exhaust port 38 so that the duct becomes narrow. As a result, the air is blown out from the exhaust port 38 with strong force. This facilitates removal of fluff, dust, and the like from the medium 99.

The cover 32 may have a supply port 43. The supply port 43 is an opening for supplying air into the cover 32. Through the supply port 43, air is supplied to the inside of the cover 32 by a supply fan 52 (to be described later). The supply port 43 is located further downstream than the intake port 36 in the transport direction Y. For example, the supply port 43 is opened in the first cover member 33. Through the supply port 43, air is supplied to the first space A1. The supply port 43 may be composed of a plurality of through holes 37, similar to the intake port 36.

The cover 32 may have a collection port 44. The collection port 44 is an opening for exhausting air from inside the cover 32. Through the collection port 44, air is exhausted from inside the cover 32 by the collection fan 53 (to be described later). The collection port 44 is located further downstream than the supply port 43 in the transport direction Y. For example, the supply port 43 is opened in the first cover member 33. Thus, through the collection port 44, air is exhausted from the first space A1. In the first space A1, air supplied from the supply port 43 is exhausted through the collection port 44. The collection port 44 may be composed of a plurality of through holes 37, similar to the intake port 36.

From the collection port 44, mist is exhausted together with air from the first space A1. When liquid is ejected from the head 13, mist stays inside the cover 32. In particular, mist tends to stay between the head 13 and the support section 30. If mist stays between the head 13 and the support section 30, the recording quality may be affected. Thus, the mist is exhausted outside of the cover 32 through the collection port 44. Through the collection port 44, mist is exhausted together with air supplied from the supply port 43. The transport device 21 may be equipped with a filter that collects mist exhausted from the collection port 44.

The cover 32 may have a supply duct 45. The supply duct 45 is a duct that connects to the supply port 43. The supply duct 45 is attached to the first cover member 33. The supply duct 45 is located, for example, further above than the recording section 12. Air supplied from the supply port 43 flows through the supply duct 45.

The supply duct 45 has a blowout port 46. Through the blowout port 46, air is supplied inside the cover 32. Air is blown out from the blowout port 46 into the first space A1 by the supply fan 52. The supply duct 45 extends from the supply port 43 to the blowout port 46 so that the duct becomes narrow. As a result, the air is blown out from the blowout port 46 with strong force.

In the supply duct 45, the blowout port 46 opens toward the vertical direction. The blowout port 46 is located further above than the recording section 12. The blowout port 46 is located further upstream than the head 13 in the transport direction Y. The blowout port 46 blows air downward. The air blown out from the blowout port 46 hits the transport belt 25. As a result, the air blown out from the blowout port 46 is divided into air flowing downstream in the transport direction Y along the transport belt 25 and air flowing upstream in the transport direction Y along the transport belt 25. As described above, the intake port 36 limits the amount of air that is drawn in, so some of the air tends to flow upstream in the transport direction Y along the transport belt 25 by the fan 51. The air flowing downstream in the transport direction Y flows between the head 13 and the support section 30. This suppresses the retention of mist. The air flowing upstream in the transport direction Y flows from the first space A1 to the second space A2. This reduces the possibility of heat from the pressing section 31 being conducted into the first space A1.

The cover 32 may have a collection duct 47. The collection duct 47 is a duct connects to the collection port 44. The collection duct 47 is attached to the first cover member 33. The collection duct 47 is located, for example, further above than the recording section 12.

The collection duct 47 has a recovery port 48. Through the recovery port 48, mist flows into the collection duct 47 with air. The air and mist inflow into the collection duct 47 through the recovery port 48 by the collection fan 53. In the collection duct 47, the recovery port 48 opens toward the vertical direction. The recovery port 48 is located further downstream than the head 13 in the transport direction Y. This enables the air that passes between the head 13 and the support section 30 to flow efficiently toward the recovery port 48. Specifically, as shown by white arrows in the first space A1, air flows from the blowout port 46 toward the recovery port 48.

The cover 32 may have a partition plate 49. The partition plate 49 is attached to the second cover member 34. The partition plate 49 is located between the pressing section 31 and the winding roller. The partition plate 49 reduces the possibility of the pressing section 31 being cooled more than necessary. The partition plate 49 also reduces the possibility of dust entering the second space A2.

The transport device 21 is equipped with the fan 51. The fan 51 is located inside the cover 32. Specifically, the fan 51 is located further upstream than the intake port 36 in the transport direction Y. When the fan 51 is driven, air is drawn in through the intake port 36. Thus, heat from the pressing section 31 is less likely to be transferred downstream in the transport direction Y.

The fan 51 is located further downstream than the exhaust port 38 in the transport direction Y. When the fan 51 is driven, air is exhausted from the exhaust port 38. Thus, fluff, dust, and the like adhering to the medium 99 are removed.

The fan 51 is located in the exhaust duct 41. This effectively exhausts the air from the exhaust port 38. The fan 51 may be located in the intake duct 39, or may be attached to the second cover member 34.

The transport device 21 may be equipped with the supply fan 52. The supply fan 52 is located in the cover 32. In detail, the supply fan 52 is located in the supply duct 45. When the supply fan 52 is driven, air is supplied through the supply port 43 to the supply duct 45. When the supply fan 52 is driven, air is blown out from the blowout port 46.

The transport device 21 may be equipped with the collection fan 53. The collection fan 53 is located in the cover 32. Specifically, the collection fan 53 is located in the collection duct 47. When the collection fan 53 is driven, air and mist flow into the collection duct 47 through the recovery port 48. When the collection fan 53 is driven, the air and the mist are exhausted from the collection port 44.

Operations and Effects

Next, actions and effects of the above-described embodiment will be described.

(1) The fan 51 is located further upstream than the intake port 36 in the transport direction Y. The intake port 36 is located between the recording section 12 and the pressing section 31 in the transport direction Y. According to the above configuration, the air that is drawn in from the intake port 36 flows upstream in the transport direction Y. Therefore, heat from the pressing section 31 is less likely to be conducted downstream in the transport direction Y.

(2) The exhaust port 38 is located further upstream than the fan 51 in the transport direction Y. The fan 51 exhausts air from the inside of the cover 32 through the exhaust port 38 and blows the air onto the medium 99 located further upstream in the transport direction Y than the pressing section 31. According to the above configuration, air heated by the pressing section 31 is blown onto the medium 99, and then the medium 99 is preheated. This makes it easier for the medium 99 to stick to the transport belt 25. In addition, by blowing air onto the medium 99 by the fan 51, fluff, dust, and the other particles adhering to the medium 99 can be removed. This improves the recording quality by the recording section 12.

(3) The exhaust duct 41 is located above the pressing section 31. The inflow port 42 opens toward the pressing section 31. According to the above configuration, the air in the cover 32 flows into the exhaust duct 41 through the inflow port 42 while hitting the pressing section 31. This cools the pressing section 31. Therefore, possibility of heat from the pressing section 31 being conducted downstream in the transport direction Y is reduced.

(4) The inflow port 42 is located above a region where the pressing section 31 moves. According to the above configuration, the air in the cover 32 flows into the exhaust duct 41 through the inflow port 42 while hitting the pressing section 31 that can move. This cools the pressing section 31.

(5) The air intake duct 39 is located between the recording section 12 and the pressing section 31 in the transport direction Y. The outflow port 40 opens toward the upstream in the transport direction Y. According to the above configuration, the air drawn in from the intake port 36 flows out through the outflow port 40 toward upstream in the transport direction Y. This reduces the possibility of heat from the pressing section 31 being conducted downstream in the transport direction Y.

Modifications

The above embodiments may be modified as follows. The above embodiments and the following modifications can be implemented in combination with each other to the extent that there is no technical contradiction.

- The pressing section 31 may be configured to displace between a position in contact with the medium 99 and a position separated from the medium 99.
- The liquid ejected by the head 13 is not limited to ink, but can also be, for example, a liquid in which particles of functional material are dispersed or mixed in the liquid. For example, the head 13 may eject a liquid containing materials such as electrode or pixel materials in the form of dispersion or dissolution for use in the manufacture of liquid crystal displays, electroluminescence displays, and surface light emitting displays.

Technical Ideas

Hereinafter, technical ideas grasped from the above embodiments and modifications, and operations and effects thereof, will be described.

A. A transport device is a transport device that transports a medium to be recorded by a recording section, includes a transport belt for transporting the medium; a pressing section that is located further upstream in a transport direction of the medium than is the recording section and that presses the medium against the transport belt while heating the medium; a cover that covers the recording section and the pressing section and that has an intake port; and a fan that draws air into the cover through the intake port and that is located further upstream in the transport direction than is the intake port, wherein the intake port is located between the recording section and the pressing section in the transport direction. According to the above configuration, the air drawn in from the intake port flows toward upstream in the transport direction. Therefore, heat from the pressing section is less likely to be conducted downstream in the transport direction Y.

B. The above transport device may be configured such that the cover has an exhaust port, the exhaust port is located further upstream in the transport direction than is the fan, and the fan blows air onto the medium located further upstream than the pressing section in the transport direction and then exhausts the air from inside of the cover through the exhaust port. According to the above configuration, the air heated by the pressing section is blown onto the medium, and then the medium is preheated. This makes it easier for the medium 99 to stick to the transport belt 25.

C. The above transport device may be configured such that the cover has an exhaust duct connecting to the exhaust port, the exhaust duct is located above the pressing section, the exhaust duct has an inflow port, and the inflow port is open toward the pressing section. According to the above configuration, the air in the cover flows into the exhaust duct through the inflow port while hitting the pressing section. This cools the pressing section. Therefore, the possibility of heat from the pressing section being conducted downstream in the transport direction is reduced.

D. The above transport device may be configured such that the pressing section presses the medium against the transport belt while reciprocating in the transport direction and the inflow port is located above a region where the pressing section moves. According to the above configuration, the air in the cover flows into the exhaust duct through the inflow port while hitting the pressing section that can move. This cools the pressing section.

E. The above transport device may be configured such that the cover has an intake duct connecting to the intake port, the intake duct is located between the recording section and the pressing section in the transport direction, the intake duct has an outflow port, and the outflow port is open toward upstream in the transport direction. According to the above configuration, the air drawn in from the intake port flows toward upstream in the transport direction through the outflow port. This reduces the possibility of heat from the pressing section being conducted downstream in the transport direction.

F. A recording device includes a recording section that records to a medium; a transport belt for transporting the medium; a pressing section that is located further upstream in a transport direction of the medium than is the recording section and that presses the medium against the transport belt while heating the medium; a cover that covers the recording section and the pressing section and that has an intake port; and a fan that draws air into the cover through the intake port and that is located further upstream in the transport direction than is the intake port, wherein the intake port is located between the recording section and the pressing section in the transport direction. According to the above configuration, the same effects as the transport device described above can be obtained.

What is claimed is:

1. A transport device that transports a medium to be recorded by a recording section, the transport device comprising:

a transport belt for transporting the medium;

a pressing section that is located further upstream in a transport direction of the medium than is the recording section and that presses the medium against the transport belt while heating the medium;

a cover that covers the recording section and the pressing section and that has an intake port; and a fan that draws air into the cover through the intake port and that is located further upstream in the transport direction than is the intake port, wherein the intake port is located between the recording section and the pressing section in the transport direction.

2. The transport device according to claim 1, wherein the cover has an exhaust port, the exhaust port is located further upstream in the transport direction than is the fan, and the fan blows air on the portion of the medium that is located upstream of the pressing section in the transport direction and then exhausts the air from inside of the cover through the exhaust port.

3. The transport device according to claim 2, wherein the cover has an exhaust duct connecting to the exhaust port, the exhaust duct is located above the pressing section, the exhaust duct has an inflow port, and the inflow port opens toward the pressing section.

4. The transport device according to claim 3, wherein the pressing section presses the medium against the transport belt while reciprocating in the transport direction and the inflow port is located above a region where the pressing section moves.

5. The transport device according to claim 1, wherein the cover has an intake duct connecting to the intake port, the intake duct is located between the recording section and the pressing section in the transport direction, the intake duct has an outflow port, and the outflow port opens toward upstream in the transport direction.

6. A recording device comprising:

a recording section that records to a medium;

a transport belt for transporting the medium;

a pressing section that is located further upstream in a transport direction of the medium than is the recording section and that presses the medium against the transport belt while heating the medium;

a cover that covers the recording section and the pressing section and that has an intake port; and a fan that draws air into the cover through the intake port and that is located further upstream in the transport direction than is the intake port, wherein the intake port is located between the recording section and the pressing section in the transport direction.

* * * * *